US012783639B2

(12) United States Patent
Sharma et al.

(10) Patent No.: US 12,783,639 B2
(45) Date of Patent: Nov. 3, 2026

(54) CONFIDENTIAL COMPUTING TECHNIQUES FOR DATA CLEAN ROOMS

(71) Applicant: Habu Inc., San Francisco, CA (US)

(72) Inventors: Siddharth Sharma, Newark, CA (US); Roopak Gupta, Fremont, CA (US); Chetan Urkudkar, San Ramon, CA (US); Prashanth Jonnalagadda, Fremont, CA (US)

(73) Assignee: Habu Inc., San Francisco, CA (US)

( * ) Notice: Subject to any disclaimer, the term of this patent is extended or adjusted under 35 U.S.C. 154(b) by 542 days.

(21) Appl. No.: 18/449,973

(22) Filed: Aug. 15, 2023

(65) Prior Publication Data

US 2025/0061186 A1 Feb. 20, 2025

(51) Int. Cl.

| | |
|---|---|
| ***G06F 21/53*** | (2013.01) |
| ***H04L 9/08*** | (2006.01) |
| ***H04L 9/32*** | (2006.01) |

(52) U.S. Cl.

CPC ............ *G06F 21/53* (2013.01); *H04L 9/0825* (2013.01); *H04L 9/3213* (2013.01); *H04L 9/3263* (2013.01)

(58) Field of Classification Search

CPC ..... G06F 21/53; H04L 9/0825; H04L 9/3213; H04L 9/3263; H04L 9/3247

See application file for complete search history.

(56) References Cited

U.S. PATENT DOCUMENTS

| | | | | |
|---|---|---|---|---|
| 11,567,943 | B1 * | 1/2023 | Blum | G06F 16/2443 |
| 11,651,287 | B1 * | 5/2023 | Kostakis | G06N 20/00 706/12 |
| 11,921,884 | B2 * | 3/2024 | Gaddam | H04L 9/0897 |
| 12,010,227 | B1 * | 6/2024 | Chhabra | G06F 9/45558 |
| 2013/0145165 | A1 * | 6/2013 | Brown | H04M 1/72412 713/176 |
| 2017/0093806 | A1 * | 3/2017 | Phegade | H04L 63/0428 |

(Continued)

OTHER PUBLICATIONS

"Introduction to JSON Web Tokens", Aug. 11, 2023, Published by Auth0, pp. 1-12, obtained from https://web.archive.org/web/20230811091852/https:/jwt.io/introduction/#why-use-json-web-tokens (Year: 2023).*

(Continued)

*Primary Examiner* — Kevin L Young
*Assistant Examiner* — Jennifer Marie Gutman

(57) ABSTRACT

A method for data processing by a data clean room orchestration system is described. The method includes receiving an indication of mutually attested code for a data clean room between two or more partners. The method further includes configuring a trusted execution environment (TEE), including one or more virtual machines (VMs) that are individually or collectively operable to execute the mutually attested code. The method further includes transmitting, to endpoints associated with the partners, an attestation report including at least an encrypted token and a host public key of a host machine associated with the one or more VMs. The method further includes receiving respective partner secret keys wrapped with the host public key. The method further includes executing the mutually attested code on respective partner datasets in the TEE based on using a host private key of the host machine to unwrap the respective partner secret keys.

20 Claims, 9 Drawing Sheets

(56) References Cited

U.S. PATENT DOCUMENTS

| | | | | |
|---|---|---|---|---|
| 2017/0235957 | A1* | 8/2017 | Maletsky | H04L 63/0807 713/168 |
| 2019/0163898 | A1* | 5/2019 | Clebsch | H04L 63/126 |
| 2019/0297064 | A1* | 9/2019 | Resch | H04L 9/3271 |
| 2019/0362083 | A1* | 11/2019 | Ortiz | G06N 20/00 |
| 2020/0076794 | A1* | 3/2020 | de Boer | H04L 9/3213 |
| 2020/0167503 | A1* | 5/2020 | Wei | G06F 21/602 |
| 2021/0011984 | A1* | 1/2021 | Renke | G06F 3/0659 |
| 2021/0273921 | A1* | 9/2021 | Kumar | H04L 9/3247 |
| 2022/0103516 | A1* | 3/2022 | Pappachan | G06F 9/45558 |
| 2022/0158926 | A1* | 5/2022 | Wennerström | H04L 43/50 |
| 2022/0255731 | A1* | 8/2022 | Modica | H04L 9/085 |
| 2022/0413883 | A1* | 12/2022 | Clebsch | G06F 9/44505 |
| 2023/0004669 | A1* | 1/2023 | Langseth | G06F 16/258 |
| 2023/0131060 | A1* | 4/2023 | Ko | H04L 9/3213 713/151 |
| 2023/0308277 | A1* | 9/2023 | Van Cleve | H04L 63/0421 |
| 2024/0202315 | A1* | 6/2024 | Atamli | G06F 21/53 |
| 2024/0291650 | A1* | 8/2024 | Cela | G06F 21/602 |
| 2024/0370306 | A1* | 11/2024 | Hopper | G06F 9/5022 |
| 2024/0380595 | A1* | 11/2024 | Moyer | G06F 21/53 |

OTHER PUBLICATIONS

Jones et al., "OAuth 2.0 Authorization Server Metadata", Jun. 1, 2018, RFC Editor, United States, ISSN: 2070-1721, pp. 1-23 (Year: 2018).*

"What is an endpoint", Jun. 5, 2023, Cloudflare, pp. 1-3, obtained from https://web.archive.org/web/20230605210654/https://www.cloudflare.com/learning/security/glossary/what-is-endpoint/ (Year: 2023).*

"What is an endpoint?", Aug. 11, 2023, Microsoft, pp. 1-4, obtained from https://web.archive.org/web/20230811235916/https:/www.microsoft.com/en-us/security/business/security-101/what-is-an-endpoint (Year: 2023).*

Johnson et al., "Intel Software Guard Extensions: EPID Provisioning and Attestation Services", 2016, Intel, pp. 1-10 (Year: 2016).*

* cited by examiner

CONFIDENTIAL COMPUTING TECHNIQUES FOR DATA CLEAN ROOMS

FIELD OF TECHNOLOGY

The present disclosure relates generally to database systems and data processing, and more specifically to confidential computing techniques for data clean rooms.

BACKGROUND

In some cases, one organization may want to collaborate with another organization in a secure manner, such that both organizations can run approved queries on each other's datasets without viewing or otherwise accessing the actual data. For example, one company may want to extract customer insights from sales metrics (such as revenue growth, churn, conversion rate) of another company without being exposed to the underlying data. To do so, some providers may configure a data clean room, which enables two or more parties to run Structured Query Language (SQL) queries on aggregated and/or anonymized data in a way that ensures data privacy. However, some parties with sensitive data may be unable to participate in cloud-based data clean rooms due to compliance and/or data privacy concerns.

SUMMARY

A method is described. The method includes: receiving, by a data clean room orchestration system, an indication of mutually attested code for a data clean room between two or more partners; configuring, by the data clean room orchestration system, a trusted execution environment (TEE) for the data clean room between the two or more partners, the TEE including one or more virtual machines (VMs) that are individually or collectively operable to execute the mutually attested code; obtaining, by the one or more VMs in the TEE configured by the data clean room orchestration system, two or more partner datasets encrypted with respective secret keys of the two or more partners; transmitting, to endpoints associated with the two or more partners, an attestation report including at least an encrypted token and a host public key of a host machine associated with the one or more VMs; receiving, by the one or more VMs, the respective secret keys wrapped with the host public key of the host machine; and executing the mutually attested code on the two or more partner datasets in the TEE based on using a host private key of the host machine to unwrap the respective secret keys.

An apparatus is described. The apparatus includes: one or more memories storing code; and one or more processors coupled with the one or more memories. The one or more processors are individually or collectively operable to execute the code to cause the apparatus to: receive, by a data clean room orchestration system, an indication of mutually attested code for a data clean room between two or more partners; configure, by the data clean room orchestration system, a TEE for the data clean room between the two or more partners, the TEE including one or more VMs that are individually or collectively operable to execute the mutually attested code; obtain, by the one or more VMs in the TEE configured by the data clean room orchestration system, two or more partner datasets encrypted with respective secret keys of the two or more partners; transmit, to endpoints associated with the two or more partners, an attestation report including at least an encrypted token and a host public key of a host machine associated with the one or more VMs; receive, by the one or more VMs, the respective secret keys wrapped with the host public key of the host machine; and execute the mutually attested code on the two or more partner datasets in the TEE based on using a host private key of the host machine to unwrap the respective secret keys.

A non-transitory computer-readable medium is described. The non-transitory computer-readable medium stores code that includes instructions executable by one or more processors to: receive, by a data clean room orchestration system, an indication of mutually attested code for a data clean room between two or more partners; configure, by the data clean room orchestration system, a TEE for the data clean room between the two or more partners, the TEE including one or more VMs that are individually or collectively operable to execute the mutually attested code; obtain, by the one or more VMs in the TEE configured by the data clean room orchestration system, two or more partner datasets encrypted with respective secret keys of the two or more partners; transmit, to endpoints associated with the two or more partners, an attestation report including at least an encrypted token and a host public key of a host machine associated with the one or more VMs; receive, by the one or more VMs, the respective secret keys wrapped with the host public key of the host machine; and execute the mutually attested code on the two or more partner datasets in the TEE based on using a host private key of the host machine to unwrap the respective secret keys.

In some examples of the methods, apparatuses, and non-transitory computer-readable media described herein, at least one partner of the data clean room has an attestation policy that prohibits decryption within the TEE.

Some examples of the methods, apparatuses, and non-transitory computer-readable media described herein may further include operations, features, means, or instructions for: generating, by the host machine, a self-signed certificate and a remote attestation report including a hash value associated with the self-signed certificate; and transmitting, to an attestation endpoint of an attestation service, an attestation request including the self-signed certificate and the remote attestation report.

Some examples of the methods, apparatuses, and non-transitory computer-readable media described herein may further include operations, features, means, or instructions for receiving, from the attestation endpoint, an attestation response including the encrypted token which includes the self-signed certificate and information for token verification.

Some examples of the methods, apparatuses, and non-transitory computer-readable media described herein may further include operations, features, means, or instructions for establishing respective transport layer security (TLS) connections between the host machine and the endpoints associated with the two or more partners, where the respective secret keys are received via the respective TLS connections.

In some examples of the methods, apparatuses, and non-transitory computer-readable media described herein, the respective TLS connections are established using a self-signed certificate in the attestation report.

In some examples of the methods, apparatuses, and non-transitory computer-readable media described herein, the encrypted token includes a signature that is verifiable using a set of token signing keys provisioned by a metadata endpoint of an attestation service.

Some examples of the methods, apparatuses, and non-transitory computer-readable media described herein may further include operations, features, means, or instructions for writing, to a shared storage location configured by the data clean room orchestration system, output data that results from executing the mutually attested code on the two or more partner datasets in the TEE.

In some examples of the methods, apparatuses, and non-transitory computer-readable media described herein, the shared storage location containing the output data is accessible to the two or more partners of the data clean room.

In some examples of the methods, apparatuses, and non-transitory computer-readable media described herein, the output data is returned to the data clean room orchestration system using a private Internet Protocol (IP) address.

In some examples of the methods, apparatuses, and non-transitory computer-readable media described herein, executing the mutually attested code may include performing at least one multi-party computation (MPC) in the data clean room using encrypted data from the two or more partner datasets, where a result of the at least one MPC is returned to the data clean room orchestration system.

In some examples of the methods, apparatuses, and non-transitory computer-readable media described herein, obtaining the two or more partner datasets includes: reading a partner dataset from an encrypted data source configured by a partner of the data clean room; and transferring the partner dataset to an ephemeral data container accessible to the one or more VMs in the TEE.

In some examples of the methods, apparatuses, and non-transitory computer-readable media described herein, the host private key is protected within a sub-system of the host machine.

In some examples of the methods, apparatuses, and non-transitory computer-readable media described herein, at least one of the respective secret keys is released from a key management system in accordance with a key release policy associated with at least one partner of the data clean room.

In some examples of the methods, apparatuses, and non-transitory computer-readable media described herein, the TEE for the data clean room is configured via a control plane of the data clean room orchestration system.

DETAILED DESCRIPTION

Figure 1:
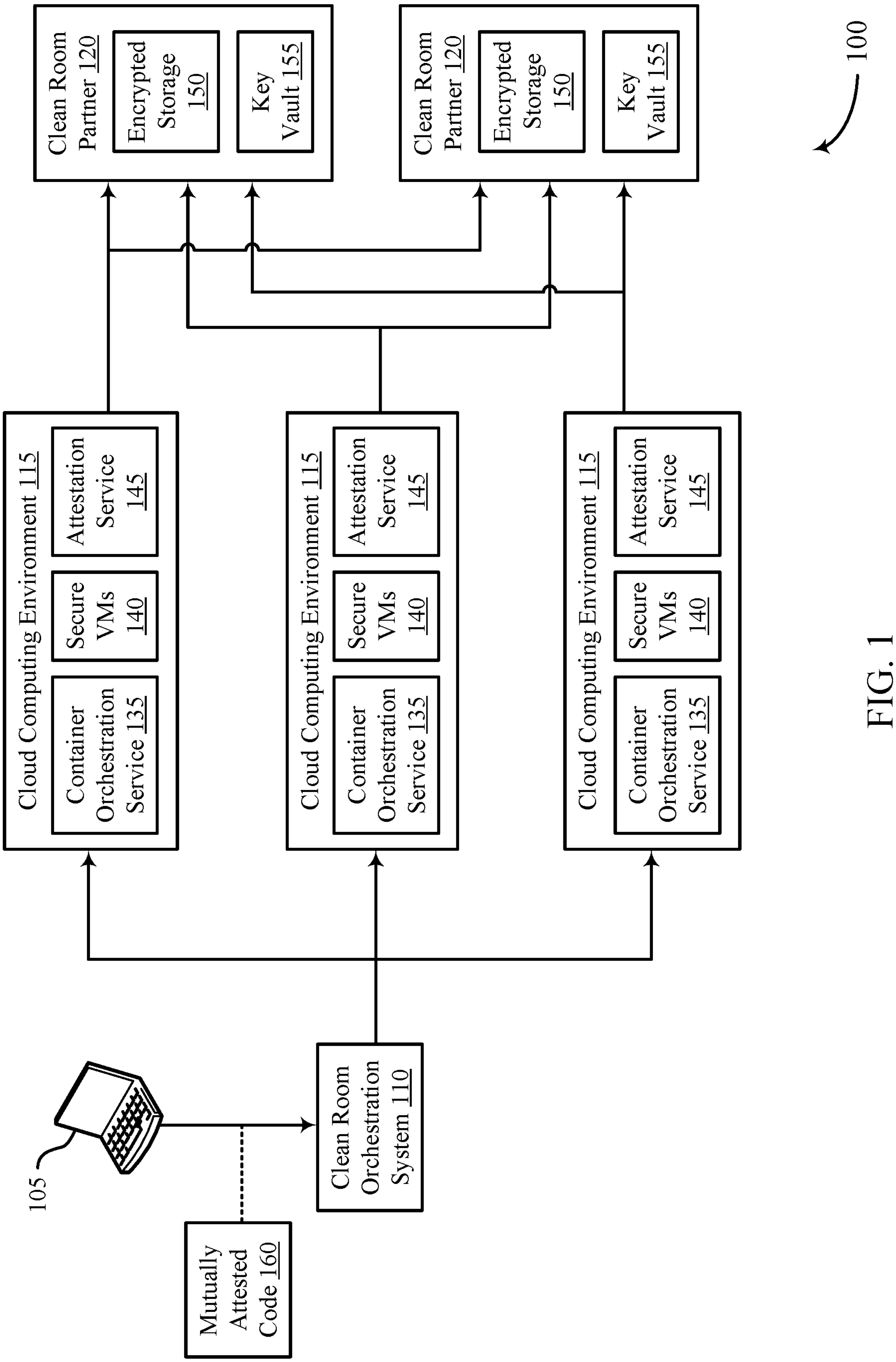
FIGS. 1 through 3 illustrate examples of data processing systems that support confidential computing techniques for data clean rooms in accordance with aspects of the present disclosure.

In some cases, an entity (such as a company, business, organization, or the like) may want to collaborate with another entity in a secure manner (i.e., without exposing sensitive or confidential information), such that both entities can run approved queries or code on each other's datasets without viewing or otherwise accessing the actual data. For example, one company may want to extract customer insights from sales metrics (such as revenue growth, churn, conversion rate) of another company without accessing the underlying data records of the other company. To do so, some providers may enable users to run Structured Query Language (SQL) queries and/or code for modeling or inferencing in a way that ensures data privacy (for example, by setting up a data clean room in which entities can exchange or otherwise share aggregated and/or anonymized data). In some implementations, a service provider may configure a data clean room for two or more entities (referred to hereinafter as partners or parties) using physical and/or virtual resources of a cloud computing environment. However, some parties that handle sensitive data may be unable to use cloud-based data clean rooms due to compliance regulations and/or data privacy concerns.

Aspects of the present disclosure generally provide for using confidential computing techniques to configure a trusted execution environment (TEE) for a cloud-based data clean room between two or more partners. As described herein, confidential computing generally refers to a mechanism of protecting data and computations from unauthorized access and exposure, even when the data is being used (i.e., processed) on external resources. Traditional computing models assume that data is safe when stored and transmitted securely. However, data that is sent to or otherwise processed by external servers (such as cloud computing resources) may be vulnerable to insider attacks, malicious software, unauthorized access, etc. Confidential computing addresses these concerns by employing trusted hardware to protect sensitive data throughout its entire lifecycle. Confidential computing involves using TEEs (also referred to herein as secure enclaves), which are hardware or software-based isolated environments that enable applications to run securely on protected resources of a host machine (such as a physical server).

In accordance with the techniques described herein, a data clean room orchestration system may receive an indication of mutually attested code (also referred to as a compute/model) for a data clean room between two or more partners. The data clean room orchestration system may configure a TEE for the data clean room using cloud computing resources. The TEE may include one or more virtual machines (VMs) or containers that are individually or collectively operable to execute the mutually attested code. A host machine running the one or more VMs or containers may transmit, to endpoints associated with the two or more data clean room partners, an attestation report including at least one encrypted token and a public key of the host machine. After verifying the contents of the attestation report, the two or more data clean room partners may return respective data encryption keys (DEKs) wrapped with the public key of the host machine. The one or more VMs or containers in the TEE may use the respective DEKs (also referred to herein as secret keys) to securely execute the mutually attested code on two or more encrypted partner datasets provided by the data clean room partners.

Aspects of the present disclosure may be implemented to realize one or more of the following advantages. The techniques described herein may promote improved data privacy, greater system security, and reduced data exposure by leveraging confidential computing to ensure that partner datasets are not tampered with or otherwise accessed by cloud operators, malicious administrators, and/or privileged software programs while the data is in use. For example, the described techniques may enable data clean room partners to securely transfer data (i.e., partner datasets and secret DEKs) to a TEE in such a way that the data is encrypted, isolated, and protected from unauthorized access at all times. As a result, partners with sensitive data (such as personally identifiable information (PII), financial data, or health information) can participate in cloud-based data clean rooms with guarantees that the data will not be compromised or accessed by unauthorized entities.

Aspects of the disclosure are initially described in the context of data processing systems, attestation process, and process flows. Aspects of the disclosure are further illustrated by and described with reference to apparatus diagrams, system diagrams, and flowcharts that relate to confidential computing techniques for data clean rooms.

FIG. 1 illustrates an example of a data processing system 100 that supports confidential computing techniques for data clean rooms in accordance with various aspects of the present disclosure. The data processing system 100 includes a client device 105, a data clean room orchestration system 110, cloud computing environments 115, and data clean room partners 120. The data clean room orchestration system 110 may communicate with one or more client devices 105, cloud computing environments 115, and/or data clean room partners 120 via a network (such as a public or private network). The network may implement (i.e., utilize) transfer control protocol and internet protocol (TCP/IP), such as the Internet, or may implement other network protocols. The network may use standard wireless and/or wired communications technologies and protocols, or custom/dedicated data communication technologies.

A client device 105 may be an example of a user device, such as a smartphone, laptop, desktop computer, tablet, sensor, or any computing device/system capable of processing, transmitting, and/or receiving communications. In some examples, a client device 105 may be operated by a user that is part of a business, an enterprise, a non-profit, a startup, or any other company type (e.g., organization type). For example, the client device 105 may belong to a user associated with a data clean room partner 120. The client device 105 may interact with the data clean room orchestration system 110 via a user interface (UI) or application programming interface (API) provided by the data clean room orchestration system 110.

A cloud computing environment 115 (also referred to as a cloud service provider or cloud computing platform) may include any number of virtual/physical machines, servers, databases, smartphones, laptops, desktop computers, tablets, or other computing devices/systems that individually or collectively provide cloud services for cloud clients (such as data clean room partners 120 and/or client devices 105). Examples of cloud computing environments 115 include (but are not limited to) Amazon Web Services™ (AWS), Microsoft Azure®, Google Cloud Platform™ (GCP), and Snowflake®. Some cloud computing environments 115 may offer infrastructure as a service (IaaS), platform as a service (PaaS), software as a service (SaaS), data storage and database services, big data and analytic capabilities, Internet of Things (IoT) functionality, artificial intelligence (AI) and machine learning services, developer tools, security and compliance services, and the like.

In some implementations, a cloud computing environment 115 may provide virtualized computing resources (such as secure VMs 140), storage, and networking, enabling users to run their applications and services without having to manage physical hardware. Some cloud computing environments 115 may enable developers to build, deploy, and scale applications/services without managing the underlying infrastructure. Some cloud computing environments 115 may host a variety of software applications that can be accessed and used over the internet. In some implementations, a cloud computing environment 115 may support scalable and secure storage options (such as Blob Storage). A cloud computing environment 115 may also support various database services, such as SQL Database, MySQL™, PostgreSQL™, and more.

Some cloud computing environments 115 may implement or support a container orchestration service 135, which controls the deployment, management, and scaling of containerized applications using Kubernetes, an open-source container orchestration platform. Examples of container orchestration services 135 include (but are not limited to) Azure Kubernetes® Service (AKS), Amazon Elastic Kubernetes Service (EKS), and Google Kubernetes Engine (GKE), among other examples. A container orchestration service 135 may be operable to manage the Kubernetes control plane, making it easier for developers and administrators to deploy their containerized applications without having to managing the underlying Kubernetes infrastructure. In some implementations, a container orchestration service 135 may use a virtual network to provide network isolation for Kubernetes clusters. Additionally, or alternatively, some container orchestration services 135 may support integrations for exposing services to the Internet. In some implementations, a container orchestration service 135 may be integrated with a container registry, enabling users to store and manage container images securely for use in Kubernetes clusters.

As described herein, a "container" refers to a logical unit that encapsulates application code and its dependencies, enabling an application to run consistently across different cloud computing environments 115. Each container operates in isolation from the host system and other containers, providing a predictable and reproducible environment for running applications. This isolation ensures that changes to one container do not affect others, making containers useful for microservice architectures and scalable deployments. In some implementations, one or more containers may be partitioned into a pod. Containers in the same pod may share the same network namespace and communicate using a local host Containers use operating system-level virtualization, where the host OS kernel is shared among all containers. Each container runs as an isolated process with its file system, libraries, and runtime environment, but all containers share the same OS kernel. VMs, on the other hand, use hardware-level virtualization. Each VM runs its operating system (including its kernel) on top of a hypervisor, which enables full isolation between VMs. VMs emulate the hardware and provide complete isolation, making them more secure in some scenarios.

A cloud computing environment 115 may support or otherwise include one or more secure VMs 140 (also referred to as confidential VMs), which are specialized VMs designed to provide a higher level of security for sensitive workloads and data. Secure VMs 140 may use TEEs to protect data and code during processing, ensuring that even cloud providers (such as Microsoft Azure, AWS, or GCP) cannot access the encrypted data. Secure VMs 140 leverage hardware-based TEEs, such as Intel Software Guard Extensions (SGX) or AMD Secure Encrypted Virtualization (SEV)-Secure Nested Paging (SNP), to create an isolated environment where sensitive data can be processed securely.

With secure VMs 140, data remains encrypted even while being processed in memory, protecting the data from potential unauthorized access at the hypervisor level, or from insiders with administrative access.

Secure VMs 140 ensure that mutually attested code 160 running inside the TEE is trusted and has not been tampered with, which helps prevent code-level vulnerabilities. For example, secure VMs 140 may create a secure enclave (e.g., a TEE) within VM memory, isolating sensitive data and operations from the rest of the VM and the underlying host. Data inside the TEE is not accessible to the hypervisor or the underlying host, providing an additional layer of isolation and security. Secure VMs 140 are useful for scenarios where organizations need to process sensitive data (such as financial data, healthcare records, or cryptographic keys) with a higher level of assurance. In some implementations, the data clean room orchestration system 110 may use secure VMs 140 to ensure that a cloud-based data clean room between two or more data clean room partners 120 meets all compliance and/or data privacy regulations of the data clean room partners 120.

In some implementations, a cloud computing environment 115 may support an attestation service 145, which helps verify the trustworthiness of a platform or environment where applications are deployed. An attestation service 145 enables developers to verify the integrity of the underlying infrastructure and attest to its security posture before deploying their applications. An attestation service 145 may support remote integrity verification, enabling developers and administrators to remotely verify the integrity of the platform where their applications are running. In some examples, remote attestation may involve using a trusted set of hardware and software components to establish a chain of trust, ensuring that the platform has not been tampered with by cloud operators, malicious administrators, etc. Using an attestation service 145 may enable developers and organizations (such as data clean room partners 120) to verify the authenticity and security of their cloud deployments, which is particularly useful when dealing with sensitive data and/or critical workloads.

A data clean room partner 120 (also referred to as a data owner, data provider, or relying party) may be an individual, group, organization, company, business, or other entity that participates in a data clean room provisioned by the data clean room orchestration system 110. A data clean room partner 120 may include any number of virtual/physical machines, servers, databases, smartphones, laptops, desktop computers, tablets, computing/storage devices, etc. As described herein, a data clean room refers to a secure environment used for collaborative data analysis, while preserving privacy and confidentiality. A data clean room enables multiple data clean room partners 120 to run queries on (and gain insights from) each other's data without sharing or exposing the underlying data. To configure a data clean room, two or more data clean room partners 120 may use the data clean room orchestration system 110 to jointly co-author mutually attested code 160 (such as a program that runs various pre-approved queries on partner datasets).

In some implementations, a data clean room partner 120 may store/maintain data in encrypted storage 150, such as an object storage layer provisioned by a cloud service provider like Amazon S3™, Microsoft Azure Blob Storage, or Google Cloud Storage. While stored in encrypted storage 150, data may be encrypted with a secret DEK of the data clean room partner 120. In some implementations, the secret DEK of the data clean room partner 120 may be protected within a key vault 155. As described herein, a key vault 155 may refer to a cloud-based service that enables secure storage and management of cryptographic keys, secrets, and certificates used for cloud applications and services. A data clean room partner 120 may use a key vault 155 to create import, and/or manage cryptographic keys (such as symmetric keys and asymmetric key pairs) that can be used for encryption, decryption, signing, data verification, etc. In some implementations, a key vault 155 may be integrated with a hardware security module (HSM), providing tamper-resistant storage and processing of cryptographic keys.

In accordance with aspects of the present disclosure, the data clean room orchestration system 110 may receive an indication of mutually attested code 160 for a data clean room between two or more data clean room partners 120. Accordingly, the data clean room orchestration system 110 may configure a TEE for the data clean room between the two or more partners 120. The TEE may include one or more secure VMs 140 that are individually or collectively operable to execute the mutually attested code 160. The one or more secure VMs 140 in the TEE may obtain two or more partner datasets encrypted with respective secret keys of the two or more partners 120. The one or more secure VMs 140 may transmit, to endpoints associated with the two or more partners 120, an attestation report including at least an encrypted token and a host public key of a host machine associated with the one or more secure VMs 140. In return, the one or more secure VMs 140 may receive the respective secret keys wrapped with the host public key of the host machine. Accordingly, the one or more secure VMs 140 may execute the mutually attested code 160 on the two or more partner datasets in the TEE based on using a host private key of the host machine to unwrap the respective secret keys.

It should be appreciated by a person skilled in the art that one or more aspects of the disclosure may be implemented in the data processing system 100 to solve additional or alternative problems, other than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
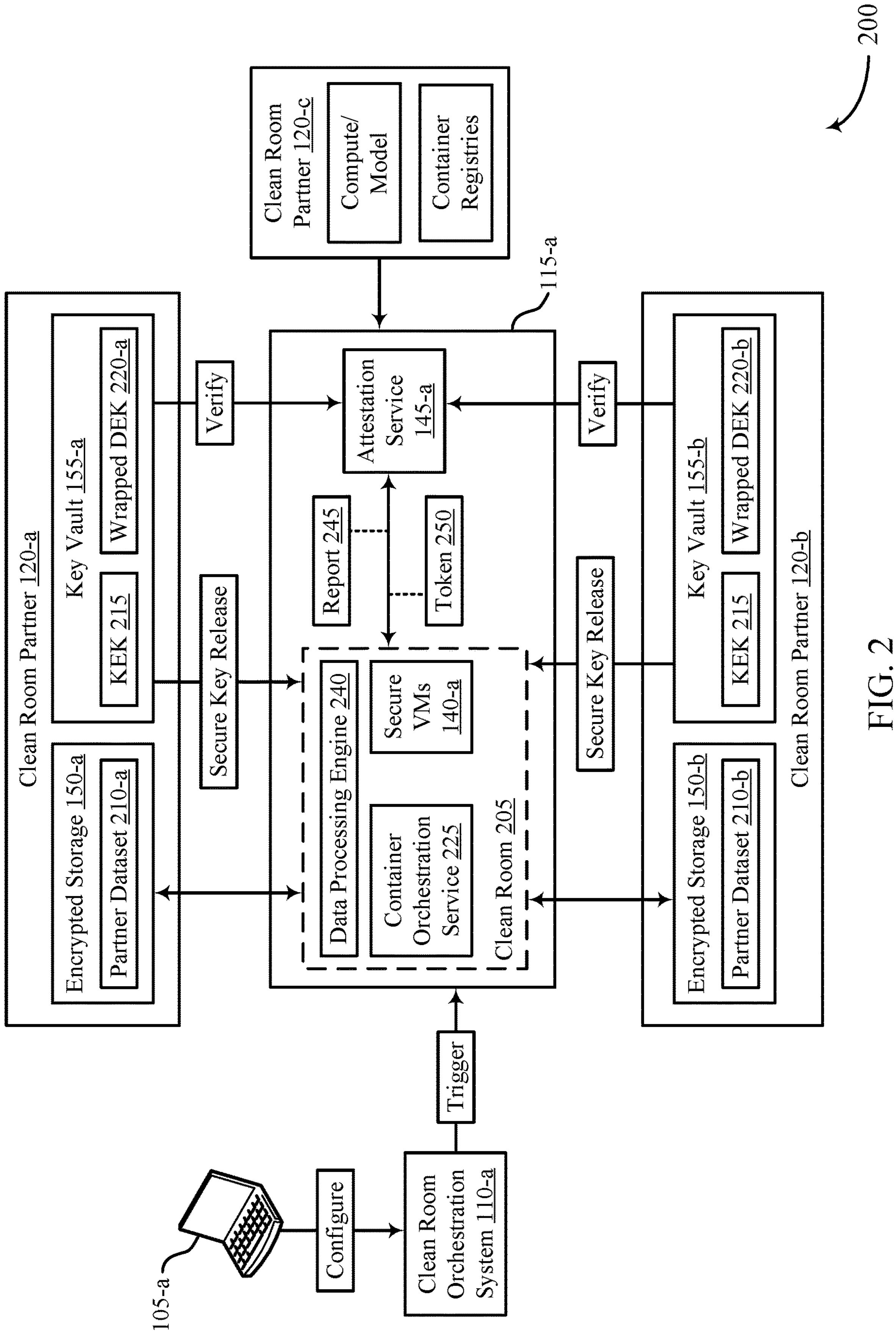

FIG. 2 shows an example of a data processing system 200 that supports confidential computing techniques for data clean rooms in accordance with aspects of the present disclosure. The data processing system 200 may implement one or more aspects of the data processing system 100. For example, the data processing system 200 includes a client device 105-*a*, a data clean room orchestration system 110-*a*, a cloud computing environment 115-*a*, a data clean room partner 120-*a* (i.e., Party 1), a data clean room partner 120-*b* (i.e., Party 2), and a data clean room partner 120-*c* (i.e., Party 3), which may be examples of corresponding elements described with reference to FIG. 1. In the example of FIG. 2, one or more secure VMs 140-*a* in a data clean room 205 may securely execute mutually attested code 160 on partner datasets 210-*a* and 210-*b* provided by the data clean room partners 120.

As described herein, data may exist in three states: in transit (when data is moving through the network), at rest (when stored), and in use (as the data is being processed). Encryption methods such Advanced Encryption Standard (AES) or Rivest Shamir Adleman (RSA) can be used to protect data at rest. Transport Layer Security (TLS), the protocol behind Hypertext Transfer Protocol Secure (HTTPS), can be used to protect data in transit. However, protecting data in use presents many challenges. For example, data in use may be subject to various attack vectors including (but not limited to) device firmware, device drivers, hypervisors, operating systems, applications, etc.

Organizations that handle sensitive data (such as PII, financial data, or health information) may face threats that target the confidentiality and integrity of applications and/or data in memory, which may deter some on premise companies may from using the cloud for certain types of data processing. Customers (such as data clean room partners 120) may also want guarantees that administrators, data center employees, and other parties cannot access the data without the consent of the customer. Customers may also want assurances that the cloud infrastructure does not contain exploits that can be exposed or abused by hackers. Zero Trust Architecture (ZTA) deployments are becoming more pervasive not just for network access, but also for accessing/executing data.

Confidential computing provides greater security during data processing by securing a portion of the processor and memory to provide an isolated container, referred to as a TEE or a secure enclave. Homomorphic encryption and confidential computing are two techniques that provide improved data security by offering complete data encryption at rest, transit, and in use. Homomorphic encryption is an extension of public-key cryptography with additional capacity for computing encrypted data without access to the secret key, meaning a server does not need to decrypt data to process it. Rather, the server can perform computations on ciphertext (encrypted data). Homomorphic encryption is software-based, meaning infrastructure providers can support homomorphic encryption on most hardware if needed. This makes homomorphic encryption relatively easy to adopt, but the lack of specialized hardware for these compute-intensive tasks, however, may limit the performance and/or real-word applicability of homomorphic encryption.

In contrast, confidential computing techniques that involve TEEs may protect processing workloads from unauthorized entities such as the host or hypervisor, system administrators, service providers, other VMs, and other processes on the host. TEEs are tamper-resistant environments that enable users to safely run sensitive workloads inside of an enclave. Enclaves are sub-systems protected by a TEE provider. The TEE provider may create the secure enclave, which is isolated from specific levels of the overall system. The use cases for confidential computing are broader than homomorphic encryption, and include support collaboration between business partners, while preserving intellectual property and anonymous processing of data for machine learning model training. One difference between confidential computing and homomorphic encryption is that with confidential computing, security is rooted at the hardware level. With HE, security is rooted at the software level with advanced math and cryptography. Confidential computing technology keeps data encrypted and strongly isolated at all times using TEE technology, and only processes the data once the cloud computing environment is verified, thereby preventing cloud operators, malicious administrators, and/or privileged software (such as the hypervisor) from accessing the data.

In some implementations, data clean room partners 120 may use the data clean room orchestration system 110-*a* as a clean room provider to perform multi-party computation (MPC). For example, the data clean room orchestration system 110-*a* may perform MPC using a partner dataset 210-*b* stored in encrypted storage 150-*b* (such as an Azure account) and a partner dataset 210-*a* hosted in another cloud provider account. The goal of MPC is to perform zero-trust analytics and share the aggregated results with each other without revealing the datasets to any parties (including the data clean room orchestration system 110-*a* and the data clean room partners 120).

Some data clean room partners 120 may have legal regulations that MPC cannot happen on clear text, even in a TEE. Thus, some implementations may involve using a mix of commutative encryption and MPC in the TEE. For example, the data clean room partner 120-*a* and the data clean room partner 120-*b* may want to share query results with each other while preserving the confidentiality of partner datasets 210-*a* and 210-*b*. Using commutative encryption, the data clean room partner 120-*b* may encrypt its partner dataset 210-*b* and protect the corresponding DEK 220-*b* in a key vault 155-*b* (such as a cloud key management service) associated with an account of the data clean room partner 120-*b*. In some implementations, the key vault 155-*b* may be backed by an HSM.

Using commutative encryption, the data clean room orchestration system 110-*a* (on behalf of the data clean room partner 120-*a*) may encrypt the partner dataset 210-*a* of the data clean room partner 120-*a* and protect the associated DEK 220-*a* in a KMS of the data clean room orchestration system 110-*a*. In turn, the data clean room partner 120-*b* and the data clean room orchestration system 110-*a* may co-author a program (such as the mutually attested code 160) that determines the results, and run the program in the TEE configured by the data clean room orchestration system 110-*a*. In some implementations, the data clean room orchestration system 110-*a* and one or more of the data clean room partners 120 may co-author Spark SQL containers and mutually approve the image digest, thereby ensuring the integrity of the code/program that can perform the secure key release. The data clean room partner 120-*b* may configure its KMS (such as the key vault 155-*b*) to give the program access to the DEK 220-*b* owned by the data clean room partner 120-*b*.

In the TEE, the data clean room orchestration system 110-*a* may (in some implementations) re-encrypt the partner dataset 210-*b* with the DEK 220-*a* of the data clean room partner 120-*a* and/or re-encrypt the partner dataset 210-*a* of the data clean room partner 120-*a* with the DEK 220-*b* of the data clean room partner 120-*b*. A data processing engine 240 may then process both encrypted partner datasets 210-*a* and 210-*b* in the TEE, and write the result to a shared storage account associated with the data clean room orchestration system 110-*a*. The data processing engine 240 may include a job analytics engine (such as Apache Spark®), a containerization platform (such as Docker™), and a data analysis library (such as Pandas™), which VMs and/or containers in the data clean room 205 may use to process the encrypted partner datasets 210-*a* and 210-*b*.

Figure 3:
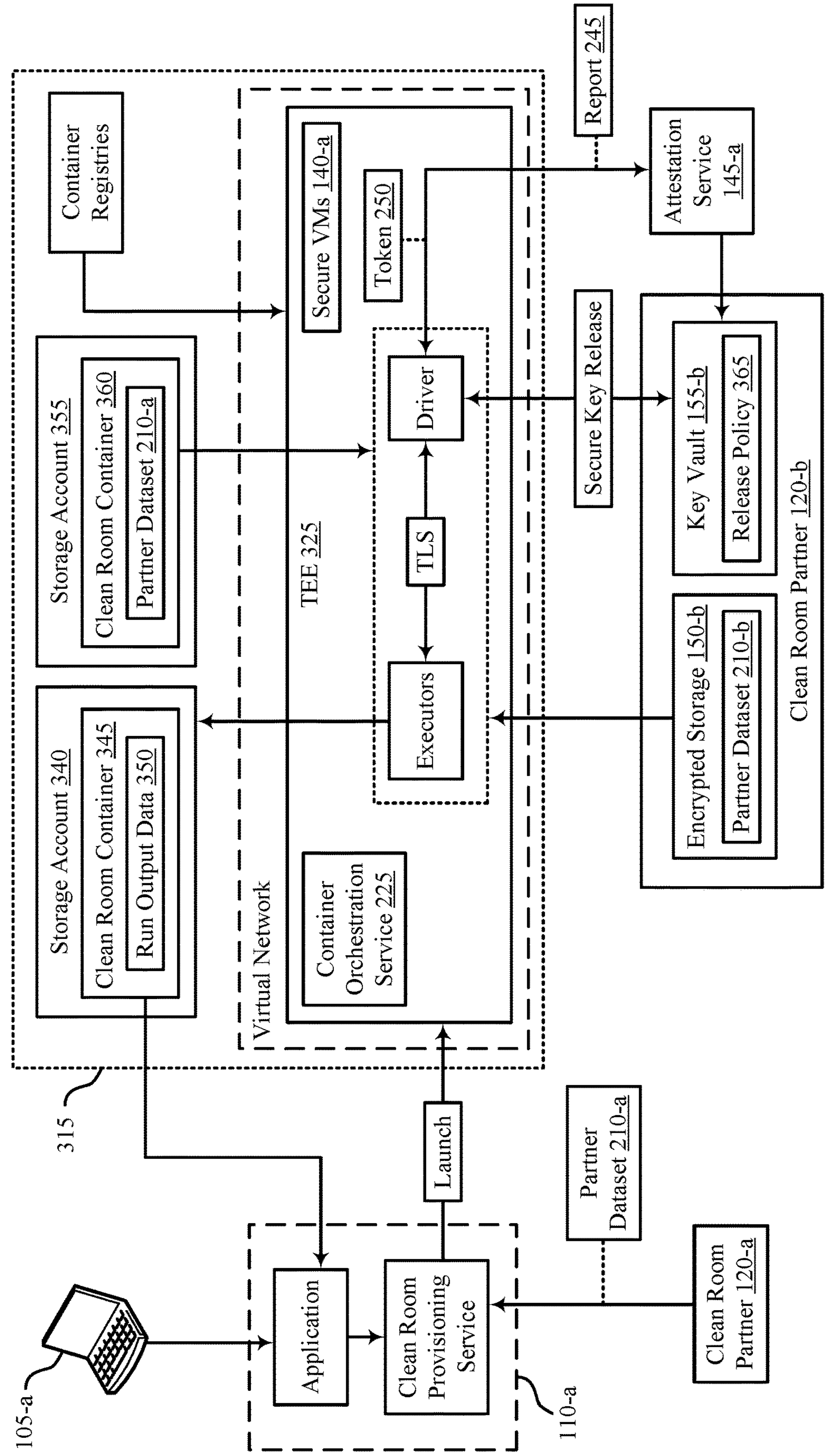

FIG. 3 shows an example of a data processing system 300 that supports confidential computing techniques for data clean rooms in accordance with aspects of the present disclosure. The data processing system 300 may implement one or more aspects of the data processing system 100 or the data processing system 200. For example, the data processing system 300 includes a client device 105-*a*, a data clean room orchestration system 110-*a*, a data clean room partner 120-*a* (i.e., Party 1), and a data clean room partner 120-*b* (i.e., Party 2), which may be examples of corresponding elements described with reference to FIG. 1. In the example of FIG. 3, one or more secure VMs 140-*a* in a TEE 325 configured by the data clean room orchestration system 110-*a* may securely execute mutually attested code 160 on partner datasets 210-*a* and 210-*b* provided by data clean room partners 120. One or more of the operations depicted in the data processing system 300 may occur within a data plane 315 of the cloud computing environment 115-*a*, as shown and described with reference to FIG. 2.

The TEE 325 may use hardware root-of-trust to ensure data is protected and anchored into hardware. This trust is rooted in the hardware manufacturer, so cloud operators cannot modify the hardware configurations. The TEE 325 may leverage remote attestation for data clean room partners 120 (as shown and described with reference to FIG. 4) to directly verify the integrity of the cloud computing environment in which partner data is processed. Data clean room partners 120 (also referred to as customers) can verify that both the hardware and software on which their workloads run are approved and secured before providing access to data.

Trusted launching is a mechanism that ensures secure VMs 140-*a* boot with authorized software. Trusted launching uses remote attestation for customer verification. Trusted launching can help prevent rootkits, bootkits, and other malicious firmware. The TEE 325 may provide memory isolation and encryption to ensure data is protected while being processed. The TEE 325 may use hardware-based encryption to prevent unauthorized viewing of data, even with physical access to the data center. The TEE 325 may use secure key management to ensure that keys stay encrypted during their lifecycle, and release only to authorized code (such as the mutually attested code 160 co-authored by the data clean room orchestration system 110-*a* and one or more of the data clean room partners 120).

In some implementations, the TEE 325 may be implemented as an AMD SEV-SNP VM-based TEE 325, which provides memory encryption and integrity of the VM address space as well as hardware-level isolation from other container groups, the host operating system, and the hypervisor. The Root-of-Trust, which is responsible for managing the TEE 325, provides support for remote attestation, which involves issuing an attestation report 245 that can be used by a relying party (such as the data clean room partner 120-*b*) to verify that the utility VM has been created and configured on a genuine AMD SEV-SNP central processing unit (CPU).

AMD SEV-SNP offers hardware-encrypted protection of the entire VM from unauthorized access by the host administrator. This level typically includes the hypervisor, which is managed by the cloud service provider. This type of confidential VM can prevent the cloud service provider (i.e., Microsoft Azure, AWS, GCP) from accessing data and code executed within the VM. Administrators and other applications/services running inside the VM, operate beyond the protected boundaries. These users and services can access data and code within the VM. AMD SEV-SNP technology provides VM isolation from the hypervisor. The hardware-based memory integrity protection helps prevent malicious hypervisor-based attacks. The SEV-SNP model trusts the AMD Secure Processor and the VM. The model does not trust any other hardware and software components. Untrusted components include the basic input/output system (BIOS), and the hypervisor on the host machine.

The described techniques may leverage attestation to ensure the authenticity of the TEE 325 configured by the data clean room orchestration system 110-*a*. Attestation enables one software environment to prove that a specific program is running on particular hardware. The attestation can be performed by the TEE 325 when it loads, and data clean room partners 120 can obtain a detailed attestation report 245 (also referred to as a quote) from the hardware providing the TEE 325. Further, applications running in the TEE 325 can perform attestation, establish a secure channel, and retrieve secret keys by using various tools available for specific TEEs.

As described with reference to FIG. 4, the attestation workflow may involve an attester (such as a secure VM or a container pod running in the TEE 325), a verifier (such as the attestation service 145-*a*), a relying party (such as the data clean room partner 120-*b*), and a key management service (such as the key vault 155-*b* of the data clean room partner 120-*b*). The attester is the entity that collects evidence from the TEE 325 and sends attestation requests to the verifier. The verifier is the entity which accepts TEE evidence from the attester, validates the evidence, and returns an attestation token 250 to the attester. The relying party is the entity which receives the attestation result from the attester and acquires a token 250. This entity also releases a secret (e.g., a DEK) after successful attestation. The key management service may be responsible for providing certificates, keys etc.

A container orchestration service 225 (such as AKS) may be capable of attaching node pools on AMD nodes. Confidential data analytics in this context may refer to running analytics on sensitive data with protection against data exfiltration. This includes a potential container access breach at the root level, both internally (for example, by a rogue administrator) or externally (by system compromise). Confidential data analytics help meet security and confidentiality regulations by removing untrusted parties (such as cloud operators and service or guest administrators) from the computation process. The described techniques help meet data compliance regulations through hardware-backed guarantees.

The attestation service 145-*a* (such as Microsoft Azure Attestation) is a unified solution for remotely verifying the trustworthiness of a platform and the integrity of the binaries running inside the platform. Establishing that the underlying cloud infrastructure (or cloud service) is in a desired state is paramount in confidential computing environments. A desired state is one where the underlying TEE 325 provides memory and integrity protection. Without an established desired state, relying services (such as data clean room partners 120) cannot ensure that confidential computing promises are met, which can negatively impact their security posture.

Attestation is a key function in the confidential computing environment. Attestation enables parties to verify the trustworthiness (or state) of a TEE 325. Some scenarios for guest attestation include ensuring that a secure VM is running in a TEE 325 with memory encryption and integrity on a confidential hardware platform (such as AMD) before launching sensitive workloads. Some other scenarios include ensuring that a confidential VM is in a desired state with properties such as secure boot enabled (which protects against rootkits such as firmware, bootloader, and kernel malware), virtual trusted platform module (vTPM), and other claims before launching a sensitive workload. Some other scenarios include ensuring that a relying party is presented with evidence that a confidential VM is running on a confidential hardware platform and is in a desired state to engage with for making sensitive transactions.

In the example of FIG. 3, the data clean room partner 120-*b* may encrypt the partner dataset 210-*b* with a DEK 220-*b* (which may be protected within a key vault 155-*b*). Likewise, the data clean room partner 120-*a* (or the data clean room orchestration system 110-*a*, on behalf of the data clean room partner 120-*a*) may encrypt the partner dataset

210-*a* with a DEK 220-*a* (which may be protected within a key vault 155-*a*). The encrypted partner dataset 210-*b* may be stored in encrypted storage 150-*b*, while the encrypted partner dataset 210-*a* may be stored in encrypted storage 150-*a*.

The data clean room partner 120-*b* may wrap the DEK 220-*b* with a KEK 215 (such as the host public key of a hardware device hosting the TEE 325). In some implementations, the data clean room partner 120-*a* (or the data clean room orchestration system 110-*a*, on behalf of the data clean room partner 120-*a*) may also wrap the DEK 220-*a* with the KEK 215. Accordingly, the data clean room orchestration system 110-*a* may select data from the partner datasets 210-*a* and 210-*b* for the question run (i.e., compute/model). In turn, the TEE 325 (for example, one or more secure VMs 140-*a* or container pods running in the TEE 325) may initiate a secure key release, whereby the data clean room partner 120-*b* releases the wrapped DEK 220-*b* to a set of container pods (such as a Driver or SKR Sidecar) in the TEE 325. In some implementations, the TEE 325 may initiate a similar key release with the data clean room partner 120-*a* to obtain the wrapped DEK 220-*a* from the key vault 155-*a* of the data clean room partner 120-*a*.

In some implementations, the wrapped DEK 220-*b* of the data clean room partner 120-*b* may be unwrapped (i.e., decrypted) by the trusted hardware backing the TEE 325, thereby enabling the secure VMs 140-*a* and/or container pods within the TEE 325 to decrypt (or double encrypt) the partner datasets 210-*a* and 210-*b* provided by the data clean room partners. For example, one or more pods in the TEE 325 may further encrypt the partner dataset 210-*b* of the data clean room partner 120-*b* with the DEK 220-*a* of the data clean room partner 120-*a*. Likewise, the pod(s) may further encrypt the partner dataset 210-*a* of the data clean room partner 120-*a* with the DEK 220-*b* of the data clean room partner 120-*b*. Thereafter, a set of container pods (such as Spark Executors) may execute the question run on the doubly encrypted partner datasets 210-*a* and 210-*b*. The set of container pods may write output data 350 from the question run to an ephemeral clean room container 345 in a storage account 340 created by the data clean room orchestration system 110-*a*. From there, the run output data 350 may be written, returned, or otherwise made available to the data clean room partner 120-*a* and the data clean room partner 120-*b*.

Figure 4:
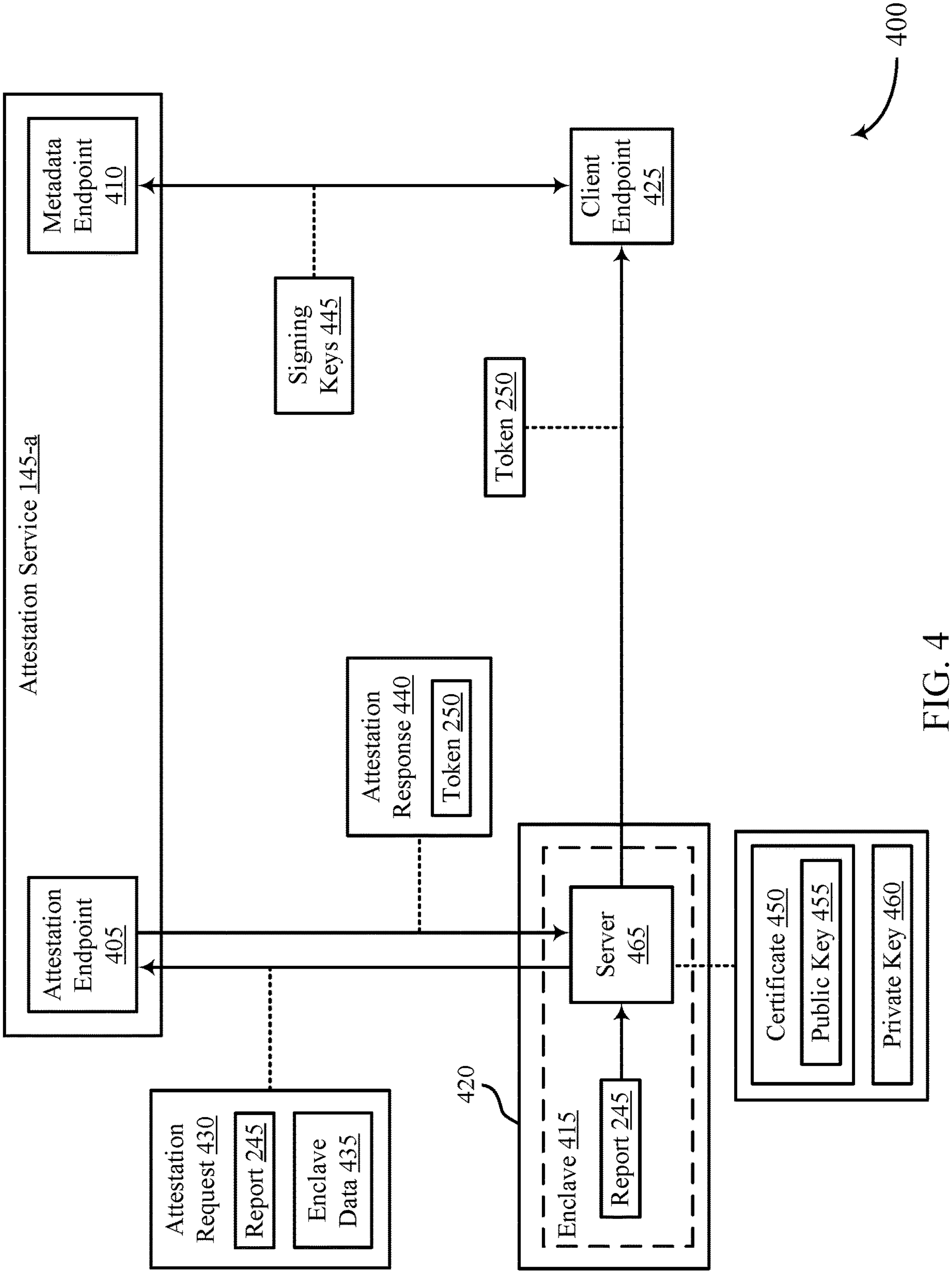
FIG. 4 shows an example of an attestation process that supports confidential computing techniques for data clean rooms in accordance with aspects of the present disclosure.

FIG. 4 shows an example of an attestation process 400 that supports confidential computing techniques for data clean rooms in accordance with aspects of the present disclosure. The attestation process 400 may implement one or more aspects of the data processing systems shown and described with reference to FIGS. 1 through 3. For example, the attestation process 400 involves an attestation service 145-*a* (such as Microsoft Azure Attestation), which may be an example of an attestation service 145 described herein, including with reference to FIGS. 1 through 3. The attestation process 400 also involves a server 465, which may include one or more secure VMs 140 or pods operating in a secure enclave 415 of a host machine 420. In some implementations, the host machine 420 may be an example of a trusted hardware device provisioned by a cloud service provider of a cloud computing environment 115.

To begin the attestation process 400, the server 465 (i.e., attester) running in the secure enclave 415 generates a self-signed certificate 450 and a remote attestation report 245 including the certificate's hash. The server 465 thereby binds the self-signed certificate 450 to the identity of the secure enclave 415. Accordingly, the server 465 may transmit an attestation request 430 containing the report 245 and enclave-generated data 435 (associated with the self-signed certificate 450) to an attestation endpoint 405 of the attestation service 145-*a* (i.e., verifier).

In turn, the attestation service 145-*a* may validate the report 245 to ensure that the report 245 contains the hash of the self-signed certificate 450. If the contents of the attestation request 430 are valid, the attestation service 145-*a* may generate a signed JavaScript™ Object Notation Web Token (JWT) and return the token 250 to the server 465 in an attestation response 440. The token 250 may contain the self-signed certificate 450 and information for token verification.

Accordingly, the server 465 may run HTTPS and provide the following endpoints to a client endpoint 425 of a data clean room partner 120: "/token" returns the JSON Web Token; "/secret" receives the secret via a query parameter named s. Accordingly, the client endpoint 425 (i.e., relying party) may obtain a set of token signing keys 445 from a metadata endpoint 410 of the attestation service 145-*a*. In some implementations, the client endpoint 425 may use TLS to securely obtain the set of token signing keys 445 from the metadata endpoint 410 of the attestation service 145-*a*.

Thereafter, the data clean room partner 120 may verify the signature of the encrypted token 250 and the claims from the token body. For example, the data clean room partner 120 can verify the report 245 using a certificate chain that has a root of the chip provider (such as Intel® or AMD®). If the encrypted token 250 is valid and contains the correct report 245, the identity and integrity of the server 465 is guaranteed. Accordingly, the client endpoint 425 may extract the self-signed certificate 450 from the report 245 and establish a secure TLS connection with the server 465 in the secure enclave 415 of the host machine 420 using the validated certificate 450. The client endpoint 425 may use a host public key 455 from the self-signed certificate 450 to wrap a secret key (such as a DEK) and send the wrapped secret key to the server 465.

Upon receiving the wrapped secret key from the client endpoint 425, the server 465 may use a host private key 460 of the host machine 420 to unwrap the secret key. The host private key 460 may be protected within the secure enclave 415 of the host machine 420. In some implementations, the host private key 460 may be an example of an asymmetric RSA private key. The server 465 may use the unwrapped secret key provided by the client endpoint 425 to encrypt/decrypt partner datasets 210-*a* and 210-*b* within the secure enclave 415.

Figure 5:
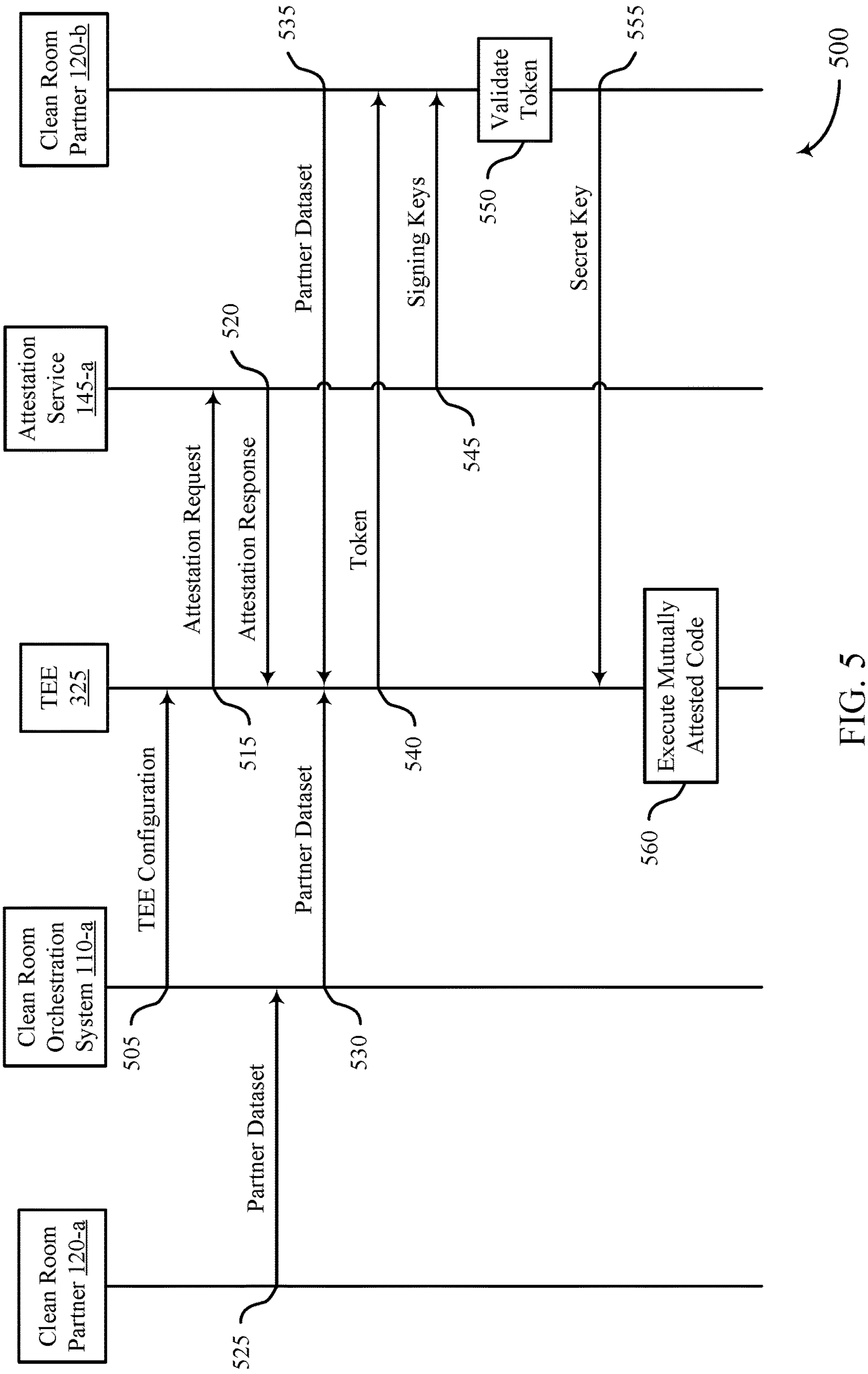
FIG. 5 shows an example of a process flow that supports confidential computing techniques for data clean rooms in accordance with aspects of the present disclosure.

FIG. 5 shows an example of a process flow 500 that supports confidential computing techniques for data clean rooms in accordance with aspects of the present disclosure. The process flow 500 may implement one or more aspects of the data processing systems and/or attestation processes shown and described with reference to FIGS. 1 through 4. For example, the process flow 500 includes a data clean room partner 120-*b*, a data clean room orchestration system 110-*a*, a TEE 325, an attestation service 145-*a*, and a data clean room partner 120-*a*, which may be examples of corresponding elements described with reference to FIGS. 1 through 4. In the following description of the process flow 500, operations between the data clean room partners 120, the TEE 325, the data clean room orchestration system 110-*a*, and/or the attestation service 145-*a* may be added, omitted, or performed in a different order (with respect to the exemplary order shown).

At 505, the data clean room orchestration system 110-*a* may configure the TEE 325 for a data clean room 205 between the data clean room partner 120-*a* and the data clean room partner 120-*b*. As described herein, the TEE 325 may include one or more secure VMs 140-*a* and/or container pods that are collectively or individually operable to execute mutually attested code 160 provided by the data clean room orchestration system 110-*a*. In some implementations, the mutually attested code 160 may be co-authored by the data clean room orchestration system 110-*a* and one or more of the data clean room partners 120.

At 515, the one or more secure VMs 140-*a* and/or container pods in the TEE 325 (referred to hereinafter as the server 465) may transmit an attestation request 430 to an attestation endpoint 405 of the attestation service 145-*a*. The attestation request 430 may include a self-signed certificate 450 of a host machine 420 associated with the server 465 and an attestation report 245 containing a hash value associated with the self-signed certificate 450. The self-signed certificate 450 may include a host public key 455 (such as the KEK 215) of the host machine 420 associated with the server 465.

At 520, the attestation service 145-*a* may verify the attestation request 430 and return an attestation response 440 including an encrypted token 250 provisioned by the attestation service 145-*a*. In some implementations, the encrypted token 250 may include a signed JWT containing the self-signed certificate 450 of the host machine 420 and information for token verification.

At 530, the server 465 may obtain two or more partner datasets 210-*a* and 210-*b* encrypted with respective DEKs of the data clean room partners 120. In some implementations, to obtain the two or more partner datasets 210-*a* and 210-*b*, the data clean room orchestration system 110-*a* may read a partner dataset 210-*a* from encrypted storage 150-*a* (at 525) and transfer the encrypted partner dataset 210-*a* to a cloud storage account 355 that is accessible to the TEE 325 (at 530). Additionally, or alternatively, a data clean room partner 120-*b* may transfer a partner dataset 210-*b* directly to the TEE 325 (at 535) using a private endpoint or IP address.

At 540, the server 465 may send the encrypted token 250 to a client endpoint 425 associated with the data clean room partner 120-*b*. At 545, the client endpoint 425 may communicate with a metadata endpoint 410 of the attestation service 145-*a* to obtain a set of token signing keys 445. In some implementations, the client endpoint 425 may use TLS to obtain the set of token signing keys 445 from the metadata endpoint 410 of the attestation service 145-*a*.

At 550, the data clean room partner 120-*b* may use the set of token signing keys 445 provided by the attestation service 145-*a* to verify the encrypted token 250 received from the TEE 325. If the contents of the encrypted token 250 are valid, the data clean room partner 120-*b* may establish a secure TLS connection with the server 465, wrap a DEK 220-*b* using the host public key 455 from the self-signed certificate 450 in the encrypted token 250, and send the wrapped DEK 220-*b* to the server 465 at 555. Although not depicted in the example of FIG. 5, The server 465 may obtain a wrapped DEK 220-*a* from the data clean room partner 120-*a* in a similar manner.

After receiving wrapped DEKs 220-*a* and 220-*b* from the data clean room partners 120, the server 465 may use a host private key 460 of the host machine 420 to unwrap the DEKs 220-*a* and 220-*b*, and process the encrypted partner datasets 210-*a* and 210-*b* within the TEE 325. At 560, the server 465 may execute the mutually attested code 160 on the two or more partner datasets 210-*a* and 210-*b* in the TEE 325 and write output data 350 from the job/question run to a storage account 340 using a private endpoint or IP address. The data clean room orchestration system 110-*a* may retrieve the run output data 350 from an ephemeral clean room container 345 in the storage account 340 and distribute the output data 350 to the data clean room partners 120.

Figure 6:
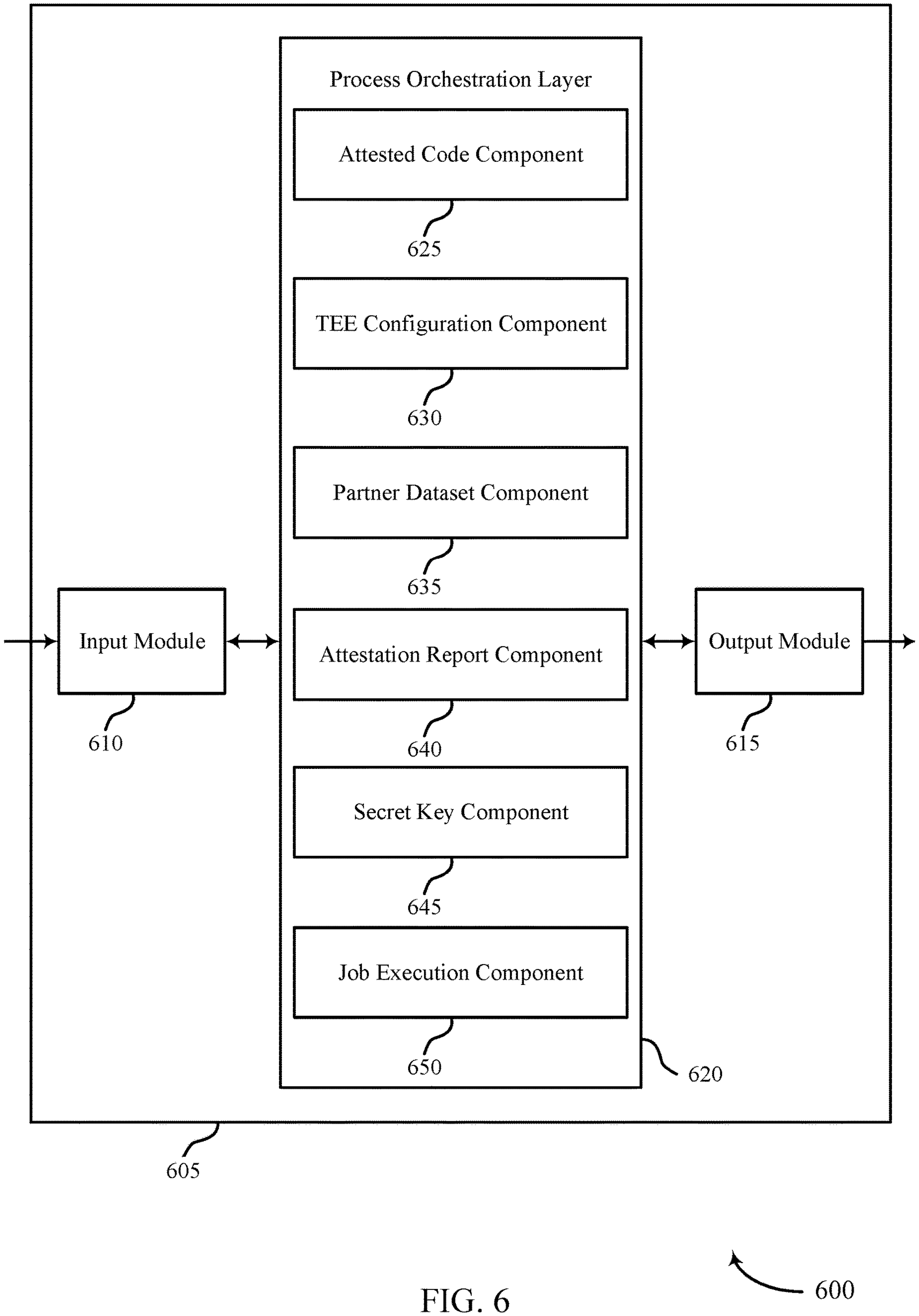
FIG. 6 shows a block diagram of an apparatus that supports confidential computing techniques for data clean rooms in accordance with aspects of the present disclosure.

FIG. 6 shows a block diagram 600 of a device 605 that supports confidential computing techniques for data clean rooms in accordance with aspects of the present disclosure. The device 605 may include an input module 610, an output module 615, and a confidential computing manager 620. The device 605 may also include one or more processors. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the confidential computing manager 620 to support confidential computing techniques for data clean rooms. In some cases, the input module 610 may be a component of an I/O controller 810, as described with reference to FIG. 8.

The output module 615 may manage output signals for the device 605. For example, the output module 615 may receive signals from other components of the device 605, such as the confidential computing manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810, as described with reference to FIG. 8.

The confidential computing manager 620 may include an attested code component 625, a TEE configuration component 630, a partner dataset component 635, an attestation report component 640, a secret key component 645, a job execution component 650, or any combination thereof. In some examples, the confidential computing manager 620, or various components thereof, may be configured to perform various operations (e.g., receiving, monitoring, transmitting) using or otherwise in cooperation with the input module 610, the output module 615, or both. For example, the confidential computing manager 620 may receive information from the input module 610, send information to the output module 615, or be integrated in combination with the input module 610, the output module 615, or both to receive information, transmit information, and/or perform various other operations described herein.

The confidential computing manager 620 may support confidential computing for data clean rooms in accordance with examples disclosed herein. The attested code component 625 may be configured to or otherwise capable of receiving an indication of mutually attested code 160 for a data clean room 205 between two or more partners 120. The TEE configuration component 630 may be configured to or otherwise capable of configuring a TEE 325 for the data clean room 205 between the two or more partners 120, the TEE 325 including one or more secure VMs 140 that are individually or collectively operable to execute the mutually attested code 160. The partner dataset component 635 may be configured to or otherwise capable of obtaining two or more partner datasets 210-*a* and 210-*b* encrypted with respective secret keys of the two or more partners 120.

The attestation report component 640 may be configured to or otherwise capable of transmitting, to client endpoints 425 associated with the two or more partners 120, an attestation report 245 including at least an encrypted token 250 and a host public key 455 of a host machine 420 associated with the one or more secure VMs 140. The secret key component 645 may be configured to or otherwise capable of receiving the respective secret keys wrapped with the host public key 455 of the host machine 420. The job execution component 650 may be configured to or otherwise capable of executing the mutually attested code 160 on the two or more partner datasets 210-*a* and 210-*b* in the TEE 325 based on using a host private key 460 of the host machine 420 to unwrap the respective secret keys.

Figure 7:
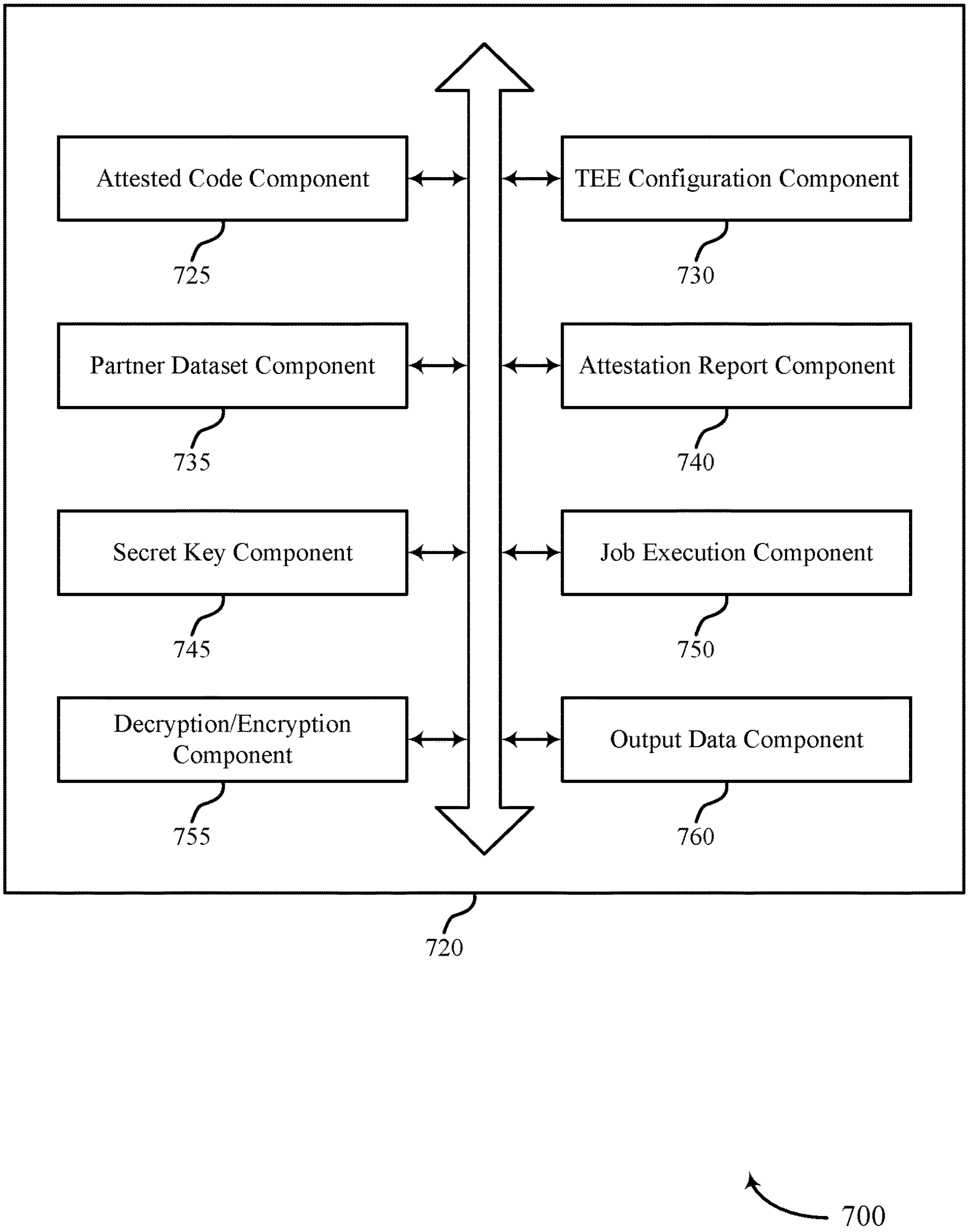
FIG. 7 shows a block diagram of a confidential computing manager that supports confidential computing techniques for data clean rooms in accordance with aspects of the present disclosure.

FIG. 7 shows a block diagram 700 of a confidential computing manager 720 that supports confidential computing techniques for data clean rooms in accordance with aspects of the present disclosure. The confidential computing manager 720 may be an example of aspects of the confidential computing manager 620 described with reference to FIG. 6. The confidential computing manager 720, or various components thereof, may be an example of means for performing various aspects of the confidential computing techniques described herein. For example, the confidential computing manager 720 may include an attested code component 725, a TEE configuration component 730, a partner dataset component 735, an attestation report component 740, a secret key component 745, a job execution component 750, a decryption/encryption component 755, an output data component 760, or any combination thereof. Each of these components may communicate, directly or indirectly, with one another (e.g., via one or more buses).

The confidential computing manager 720 may support confidential computing for data clean rooms in accordance with examples disclosed herein. The attested code component 725 may be configured to or otherwise capable of receiving an indication of mutually attested code 160 for a data clean room 205 between two or more partners 120. The TEE configuration component 730 may be configured to or otherwise capable of configuring a TEE 325 for the data clean room 205 between the two or more partners 120, the TEE 325 including one or more secure VMs 140 that are individually or collectively operable to execute the mutually attested code 160. The partner dataset component 735 may be configured to or otherwise capable of obtaining two or more partner datasets 210-*a* and 210-*b* encrypted with respective secret keys of the two or more partners 120.

The attestation report component 740 may be configured to or otherwise capable of transmitting, to client endpoints 425 associated with the two or more partners 120, an attestation report 245 including at least an encrypted token 250 and a host public key 455 of a host machine 420 associated with the one or more secure VMs 140. The secret key component 745 may be configured to or otherwise capable of receiving the respective secret keys wrapped with the host public key 455 of the host machine 420. The job execution component 750 may be configured to or otherwise capable of executing the mutually attested code 160 on the two or more partner datasets 210-*a* and 210-*b* in the TEE 325 based on using a host private key 460 of the host machine 420 to unwrap the respective secret keys.

In some examples, the attestation report component 740 (such as the server 465) may be further configured to or otherwise capable of generating a self-signed certificate 450 and a remote attestation report 245 that includes a hash value associated with the self-signed certificate 450.

In some examples, the attestation report component 740 (such as the server 465) may be further configured to or otherwise capable of transmitting, to an attestation endpoint 405 of an attestation service 145, an attestation request 430 that includes the self-signed certificate 450 and the remote attestation report 245.

In some examples, the attestation report component 740 (such as the server 465) may be further configured to or otherwise capable of receiving, from the attestation endpoint 405 of the attestation service 145, an attestation response 440 including the encrypted token 250 which contains the self-signed certificate 450 and information for token verification.

In some examples, the TEE configuration component 730 may be further configured to or otherwise capable of establishing respective TLS connections between the host machine 420 and the two or more partners 120, where the respective secret keys are received via the respective TLS connections.

In some examples, the respective TLS connections are established using a self-signed certificate 450 in the attestation report 245. In some examples, the encrypted token includes a signature that is verifiable using a set of token signing keys 445 provisioned by a metadata endpoint 410 of the attestation service 145.

In some examples, the output data component 760 may be configured to or otherwise capable of writing, to a shared storage account 355 configured by the data clean room orchestration system 110, output data 350 that results from executing the mutually attested code 160 on the two or more partner datasets 210-*a* and 210-*b* in the TEE 325.

In some examples, the data clean room orchestration system 110 may retrieve the output data 350 from the shared storage account 355 and push the output data 350 to the two or more partners 120. In some implementations, the output data 350 may be returned to the data clean room orchestration system 110 using a private IP address (also referred to as a private endpoint).

In some implementations, the job execution component 750 may be further configured to or otherwise capable of performing at least one MPC in the data clean room 205 using encrypted data from the two or more partner datasets 210-*a* and 210-*b*, where a result of the at least one MPC is returned to the data clean room orchestration system 110.

In some examples, the partner dataset component 735 may be further configured to or otherwise capable of reading partner datasets 210-*a* and 210-*b* from encrypted storage 150 configured by a partner 120 of the data clean room 205. In some examples, the partner dataset component 735 may be further configured to or otherwise capable of transferring the partner datasets 210-*a* and 210-*b* to an ephemeral data container 360 accessible to the one or more secure VMs 140 in the TEE 325.

In some implementations, the host private key 460 may be protected within a secure enclave 415 of the host machine 420. In some examples, at least one of the respective secret keys may be released from a key vault 155 in accordance with a key release policy 365 associated with a partner 120 of the data clean room 205.

In some examples, at least one partner 120 of the data clean room 205 may have an attestation policy that prohibits decryption within the TEE 325. In some implementations, the TEE 325 for the data clean room 205 may be configured via a control plane of the data clean room orchestration system 110.

Figure 8:
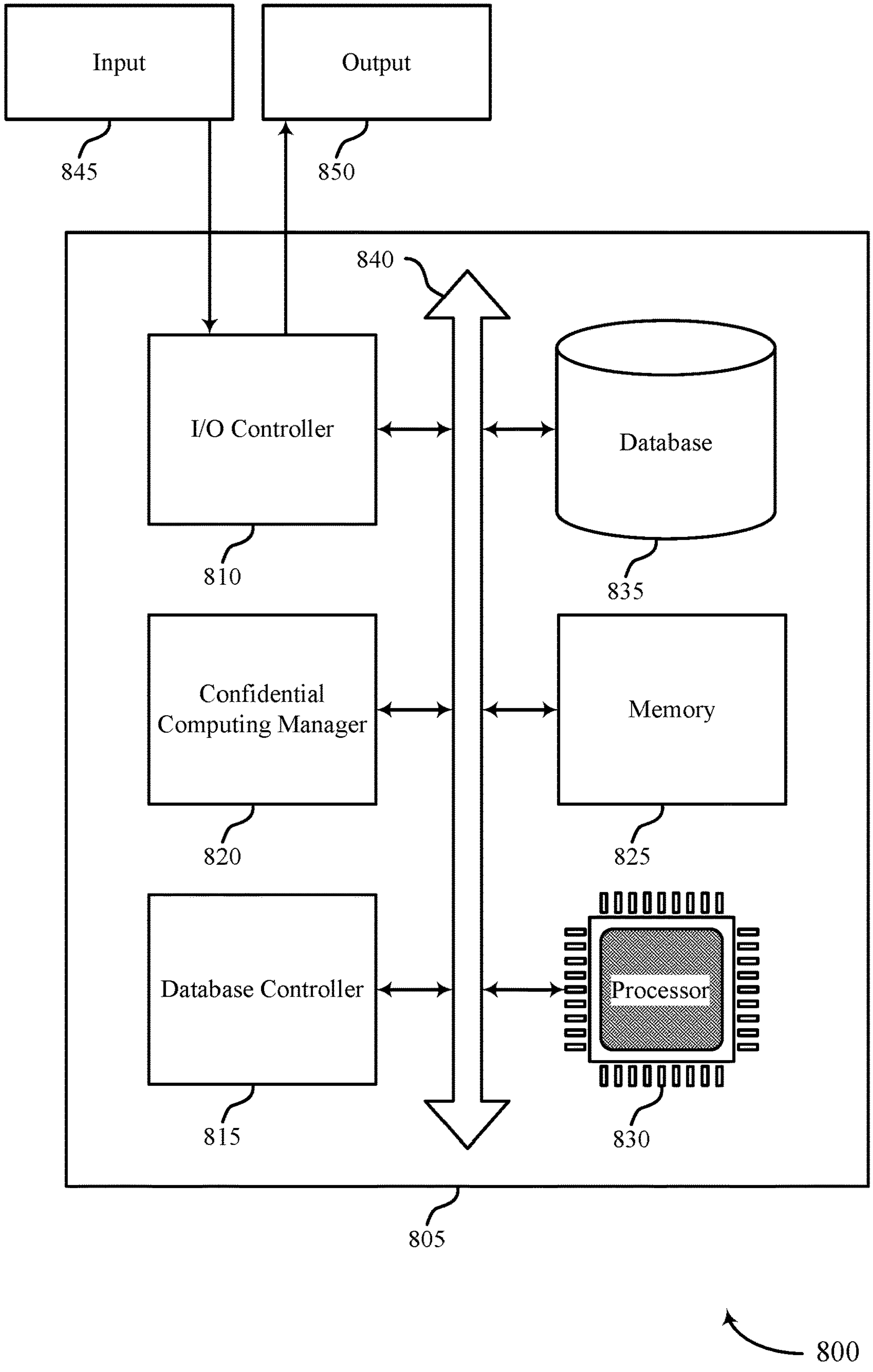
FIG. 8 shows a diagram of a system including a device that supports confidential computing techniques for data clean rooms in accordance with aspects of the present disclosure.

FIG. 8 shows a diagram of a system 800 including a device 805 that supports confidential computing techniques for data clean rooms in accordance with aspects of the present disclosure. The device 805 may be an example of or include the components of a device 605, as described herein. The device 805 may include components for bi-directional data communications including components for transmitting and receiving communications, such as a confidential computing manager 820, an input/output (I/O) controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a BIOS, which may control basic hardware or software operation such as the interaction with peripheral components or devices.

The processor 830 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting confidential computing techniques for data clean rooms).

The confidential computing manager 820 may support data processing in accordance with examples disclosed herein. For example, the confidential computing manager 820 may be configured to or otherwise capable of receiving an indication of mutually attested code 160 for a data clean room 205 between two or more partners 120. The confidential computing manager 820 may be further configured to or otherwise capable of configuring a TEE 325 for the data clean room 205 between the two or more partners 120, the TEE 325 including one or more secure VMs 140 that are individually or collectively operable to execute the mutually attested code 160.

The confidential computing manager 820 may be configured to or otherwise capable of outputting, from the processing orchestration layer to a first sub-system of the data processing system associated with a first party of the two or more parties of the secured sharing session, a request that causes the first sub-system to execute the stored procedure. The confidential computing manager 820 may be further configured to or otherwise capable of obtaining two or more partner datasets 210-*a* and 210-*b* encrypted with respective secret keys of the two or more partners 120. The confidential computing manager 820 may be configured to or otherwise capable of validating the encrypted session token provided by the first sub-system based on using a secret key to decrypt the encrypted session token.

The confidential computing manager 820 may be configured to or otherwise capable of transmitting, to client endpoints 425 associated with the two or more partners 120, an attestation report 245 including at least an encrypted token 250 and a host public key 455 of a host machine 420 associated with the one or more secure VMs 140. The confidential computing manager 820 may be configured to or otherwise capable of receiving the respective secret keys wrapped with the host public key 455 of the host machine 420. The confidential computing manager 820 may be configured to or otherwise capable of executing the mutually attested code 160 on the two or more partner datasets 210-*a* and 210-*b* in the TEE 325 based on using a host private key 460 of the host machine 420 to unwrap the respective secret keys.

By including or configuring the confidential computing manager 820 in accordance with examples as described herein, the system 800 may promote improved data privacy, greater system security, and reduced data exposure by leveraging confidential computing to ensure that partner datasets 210-*a* and 210-*b* are not tampered with or otherwise accessed by cloud operators, malicious administrators, and/or privileged software programs while the data is in use. For example, the described techniques may enable data clean room partners 120 to securely transfer data (i.e., partner datasets 210-*a* and 210-*b*, secret DEKs 220-*a* and 220-*b*) to a TEE 325 in such a way that the data is encrypted, isolated, and protected from unauthorized access at all times. As a result, partners 120 with sensitive data (such as PII, financial data, or health information) can participate in a cloud-based data clean room 205 with guarantees that the data will not be compromised or exposed to unauthorized entities.

Figure 9:
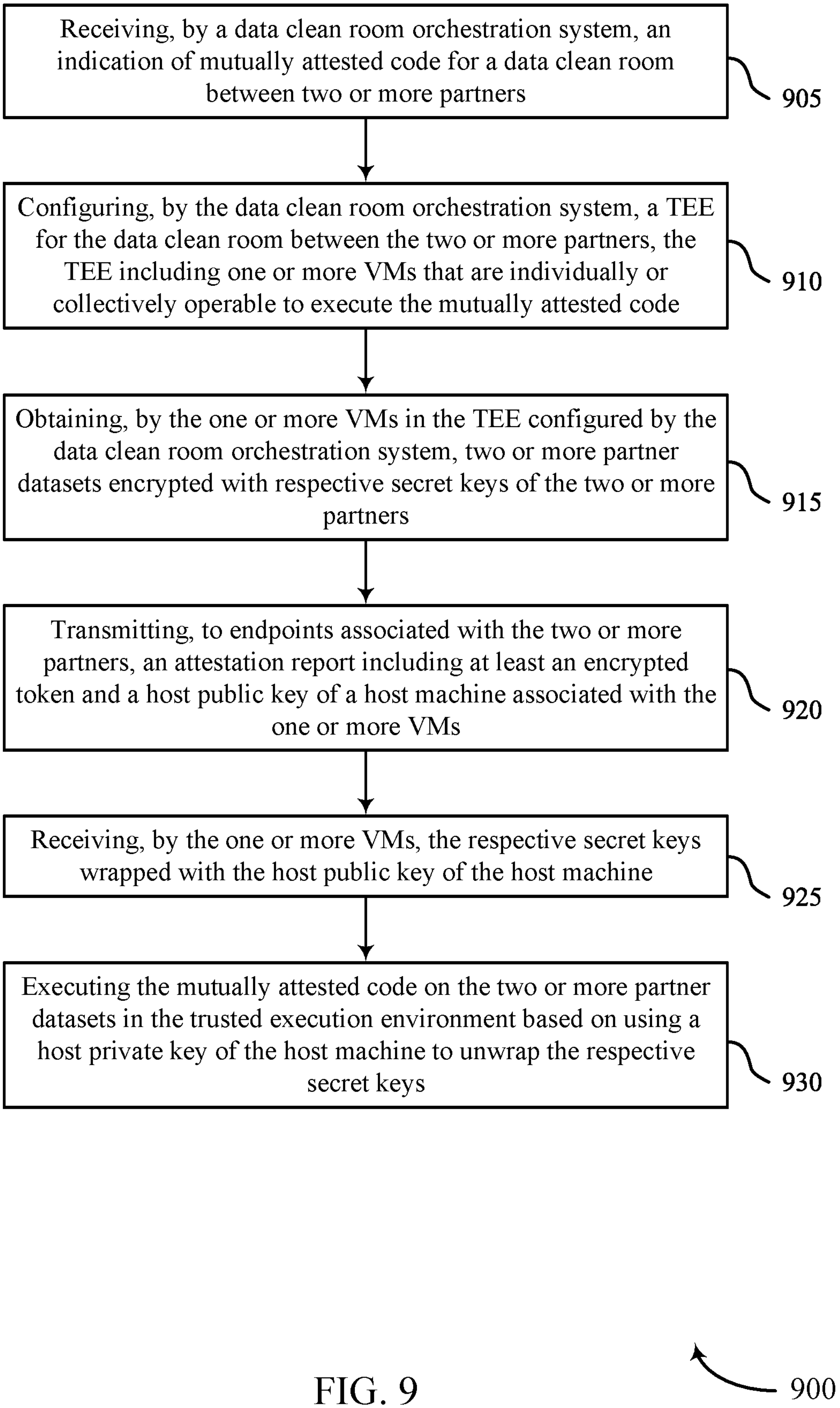
FIG. 9 shows a flowchart illustrating a method that support confidential computing techniques for data clean rooms in accordance with aspects of the present disclosure.

FIG. 9 shows a flowchart illustrating a method 900 that supports confidential computing techniques for data clean rooms in accordance with aspects of the present disclosure. The operations of the method 900 may be implemented by one or more aspects of a data processing system, such as the data processing system 200 or the data processing system 300 described with reference to FIGS. 2 and 3. In some examples, the data processing system may execute a set of instructions to control functional elements of the data processing system to perform the described functions. Additionally, or alternatively, the data processing system may perform aspects of the described functions using special-purpose hardware.

At 905, the method 900 includes receiving, by a data clean room orchestration system 110, an indication of mutually attested code 160 for a data clean room 205 between two or more partners 120. In some examples, aspects of the operations of 905 may be performed by an attested code component 725, as described with reference to FIG. 7.

At 910, the method 900 includes configuring, by the data clean room orchestration system 110, a TEE 325 for the data clean room 205 between the two or more partners 120, the TEE 325 including one or more secure VMs 140 that are individually or collectively operable to execute the mutually attested code 160. In some examples, aspects of the operations of 910 may be performed by a TEE configuration component 730, as described with reference to FIG. 7.

At 915, the method 900 includes obtaining, by the one or more secure VMs 140 in the TEE 325 configured by the data clean room orchestration system 110, two or more partner datasets 210-*a* and 210-*b* encrypted with respective secret keys of the two or more partners 120. In some examples, aspects of the operations of 915 may be performed by a partner dataset component 735, as described with reference to FIG. 7.

At 920, the method 900 includes transmitting, to endpoints 425 associated with the two or more partners 120, an attestation report 245 including at least an encrypted token 250 and a host public key 455 of a host machine 420 associated with the one or more secure VMs 140. In some examples, aspects of the operations of 920 may be performed by an attestation report component 740, as described with reference to FIG. 7.

At 925, the method 900 includes receiving, by the one or more secure VMs 140, the respective secret keys wrapped with the host public key 455 of the host machine 420. In some examples, aspects of the operations of 925 may be performed by a secret key component 745, as described with reference to FIG. 7.

At 930, the method 900 includes executing the mutually attested code 160 on the two or more partner datasets 210-*a* and 210-*b* in the TEE 325 based on using a host private key 460 of the host machine 420 to unwrap the respective secret keys. In some examples, aspects of the operations of 930 may be performed by an attestation report component 740, as described with reference to FIG. 7.

The following provides an overview of aspects of the present disclosure:

Aspect 1: A method, comprising: receiving, by a data clean room orchestration system, an indication of mutually attested code for a data clean room between two or more partners; configuring, by the data clean room orchestration system, a TEE for the data clean room between the two or more partners, the TEE comprising one or more VMs that are individually or collectively operable to execute the mutually attested code; obtaining, by the one or more VMs in the TEE configured by the data clean room orchestration system, two or more partner datasets encrypted with respective secret keys of the two or more partners; transmitting, to endpoints associated with the two or more partners, an attestation report comprising at least an encrypted token and a host public key of a host machine associated with the one or more VMs; receiving, by the one or more VMs, the respective secret keys wrapped with the host public key of the host machine; and executing the mutually attested code on the two or more partner datasets in the TEE based at least in part on using a host private key of the host machine to unwrap the respective secret keys.

Aspect 2: The method of aspect 1, wherein at least one partner of the data clean room has an attestation policy that prohibits decryption within the TEE.

Aspect 3: The method of any of aspects 1 through 2, further comprising: generating, by the host machine, a self-signed certificate and a remote attestation report comprising a hash value associated with the self-signed certificate; and transmitting, to an attestation endpoint of an attestation service, an attestation request comprising the self-signed certificate and the remote attestation report.

Aspect 4: The method of aspect 3, further comprising: receiving, from the attestation endpoint, an attestation response comprising the encrypted token which includes the self-signed certificate and information for token verification.

Aspect 5: The method of any of aspects 1 through 4, further comprising: establishing respective TLS connections between the host machine and the endpoints associated with the two or more partners, wherein the respective secret keys are received via the respective TLS connections.

Aspect 6: The method of aspect 5, wherein the respective TLS connections are established using a self-signed certificate in the attestation report.

Aspect 7: The method of any of aspects 1 through 6, wherein the encrypted token comprises a signature that is verifiable using a set of token signing keys provisioned by a metadata endpoint of an attestation service.

Aspect 8: The method of any of aspects 1 through 7, further comprising: writing, to a shared storage location configured by the data clean room orchestration system, output data that results from executing the mutually attested code on the two or more partner datasets in the TEE.

Aspect 9: The method of aspect 8, wherein the shared storage location containing the output data is accessible to the two or more partners of the data clean room.

Aspect 10: The method of aspect 8, wherein the output data is returned to the data clean room orchestration system using a private IP address.

Aspect 11: The method of any of aspects 1 through 10, further comprising: performing at least one MPC in the data clean room using encrypted data from the two or more partner datasets, wherein a result of the at least one MPC is returned to the data clean room orchestration system.

Aspect 12: The method of any of aspects 1 through 11, wherein obtaining the two or more partner datasets comprises: reading a partner dataset from an encrypted data source configured by a partner of the data clean room; and transferring the partner dataset to an ephemeral data container accessible to the one or more VMs in the TEE.

Aspect 13: The method of any of aspects 1 through 12, wherein the host private key is protected within a subsystem of the host machine.

Aspect 14: The method of any of aspects 1 through 13, wherein at least one of the respective secret keys is released from a key management system in accordance with a key release policy associated with at least one partner of the data clean room.

Aspect 15: The method of any of aspects 1 through 14, wherein the TEE for the data clean room is configured via a control plane of the data clean room orchestration system.

Aspect 16: An apparatus for data processing, comprising: one or more memories storing code; and one or more processors coupled with the one or more memories, wherein the one or more processors are individually or collectively operable to execute the code to cause the apparatus to perform a method of any of aspects 1 through 15.

Aspect 11: An apparatus for data processing, comprising: at least one means for performing a method of any of aspects 1 through 15.

Aspect 12: A non-transitory computer-readable medium storing code that comprises instructions executable by one or more processors to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. The terms "a," "at least one," "one or more," "at least one of one or more" may be interchangeable. For example, if a claim recites "a component" that performs one or more functions, each of the individual functions may be performed by a single component or by any combination of multiple components. The term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions, and "determining" can include calculating, computing, processing, deriving, investigating, looking up (such as via looking up in a table, a database or another data structure), or ascertaining. Also, "determining" can include receiving (for example, receiving information) or accessing (for example, accessing data stored in memory). Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. When the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, by a data clean room orchestration system, an indication of mutually attested code for a data clean room between two or more partners, wherein the mutually attested code is co-authored by the data clean room orchestration system and at least one of the two or more partners, and wherein an image digest of the mutually attested code has been mutually approved by the two or more partners;

configuring, by the data clean room orchestration system, a trusted execution environment for the data clean room between the two or more partners, the trusted execution environment comprising one or more secure virtual machines (VMs) that execute on a hypervisor of the host machine and that are isolated from the hypervisor and a host operating system of the host machine by a hardware-based trusted execution environment, wherein the one or more secure VMs are individually or collectively operable to execute the mutually attested code;

obtaining, by the one or more secure VMs in the trusted execution environment configured by the data clean room orchestration system, two or more partner datasets encrypted with respective secret keys of the two or more partners;

transmitting, to endpoints associated with the two or more partners, an attestation report comprising at least an encrypted token and a host public key of a host machine associated with the one or more secure VMs, wherein the host public key is contained in a self-signed certificate of the host machine that is included in the attestation report, and wherein the attestation report cryptographically binds the host public key to the host machine via a hash value of the self-signed certificate;

receiving, by the one or more secure VMs, the respective secret keys wrapped with the host public key of the host machine, wherein one of the respective secret keys is released by a corresponding one of the two or more partners in response to the corresponding partner verifying the encrypted token of the attestation report; and executing the mutually attested code on the two or more partner datasets in the trusted execution environment based at least in part on using a host private key of the host machine to unwrap the respective secret keys.

2. The method of claim 1, wherein at least one partner of the data clean room has an attestation policy that prohibits decryption within the trusted execution environment.

3. The method of claim 1, further comprising:

generating, by the host machine, a remote attestation report comprising the hash value associated with the self-signed certificate; and transmitting, to an attestation endpoint of an attestation service, an attestation request comprising the self-signed certificate and the remote attestation report.

4. The method of claim 3, further comprising:

receiving, from the attestation endpoint, an attestation response comprising the encrypted token which includes the self-signed certificate and information for token verification.

5. The method of claim 1, further comprising:

establishing respective transport layer security (TLS) connections between the host machine and the endpoints associated with the two or more partners, wherein the respective secret keys are received via the respective TLS connections.

6. The method of claim 5, wherein the respective TLS connections are established using the self-signed certificate in the attestation report.

7. The method of claim 1, wherein the encrypted token comprises a signature that is verifiable using a set of token signing keys provisioned by a metadata endpoint of an attestation service.

8. The method of claim 1, further comprising:

writing, to a shared storage location configured by the data clean room orchestration system, output data that results from executing the mutually attested code on the two or more partner datasets in the trusted execution environment.

9. The method of claim 8, wherein the shared storage location containing the output data is accessible to the two or more partners of the data clean room.

10. The method of claim 8, wherein the output data is returned to the data clean room orchestration system using a private Internet Protocol (IP) address.

11. The method of claim 1, wherein executing the mutually attested code comprises:

performing at least one multi-party computation in the data clean room using encrypted data from the two or more partner datasets, wherein a result of the at least one multi-party computation is returned to the data clean room orchestration system.

12. The method of claim 1, wherein obtaining the two or more partner datasets comprises:

reading a partner dataset from an encrypted data source configured by a partner of the data clean room; and transferring the partner dataset to an ephemeral data container accessible to the one or more secure VMs in the trusted execution environment.

13. The method of claim 1, wherein the host private key is protected within a sub-system of the host machine.

14. The method of claim 1, wherein at least one of the respective secret keys is released from a key management system in accordance with a key release policy associated with at least one partner of the data clean room.

15. The method of claim 1, wherein the trusted execution environment for the data clean room is configured via a control plane of the data clean room orchestration system.

16. An apparatus, comprising:

one or more memories storing code; and one or more processors coupled with the one or more memories and individually or collectively operable to execute the code to cause the apparatus to:

receive, by a data clean room orchestration system, an indication of mutually attested code for a data clean room between two or more partners, wherein the mutually attested code is co-authored by the data clean room orchestration system and at least one of the two or more partners, and wherein an image digest of the mutually attested code has been mutually approved by the two or more partners;

configure, by the data clean room orchestration system, a trusted execution environment for the data clean room between the two or more partners, the trusted execution environment comprising one or more secure virtual machines (VMs) that execute on a hypervisor of the host machine and that are isolated from the hypervisor and a host operating system of the host machine by a hardware-based trusted execution environment, wherein the one or more secure VMs are individually or collectively operable to execute the mutually attested code;

obtain, by the one or more secure VMs in the trusted execution environment configured by the data clean room orchestration system, two or more partner datasets encrypted with respective secret keys of the two or more partners;

transmit, to endpoints associated with the two or more partners, an attestation report comprising at least an encrypted token and a host public key of a host machine associated with the one or more secure VMs, wherein the host public key is contained in a self-signed certificate of the host machine that is included in the attestation report, and wherein the attestation report cryptographically binds the host public key to the host machine via a hash value of the self-signed certificate;

receive, by the one or more secure VMs, the respective secret keys wrapped with the host public key of the host machine, wherein one of the respective secret keys is released by a corresponding one of the two or more partners in response to the corresponding partner verifying the encrypted token of the attestation report; and execute the mutually attested code on the two or more partner datasets in the trusted execution environment based at least in part on using a host private key of the host machine to unwrap the respective secret keys.

17. The apparatus of claim 16, wherein the one or more processors are individually or collectively operable to execute the code to further cause the apparatus to:

generate, by the host machine, a remote attestation report comprising the hash value associated with the self-signed certificate; and transmit, to an attestation endpoint of an attestation service, an attestation request comprising the self-signed certificate and the remote attestation report.

18. The apparatus of claim 16, wherein the one or more processors are individually or collectively operable to execute the code to further cause the apparatus to:

receive, from an attestation endpoint of a remote attestation service, an attestation response comprising the encrypted token which includes the self-signed certificate of the host machine and information for token verification.

19. The apparatus of claim 16, wherein the one or more processors are individually or collectively operable to execute the code to further cause the apparatus to:

write, to a shared storage location configured by the data clean room orchestration system, output data associated with executing the mutually attested code on the two or more partner datasets in the trusted execution environment.

20. A non-transitory computer-readable medium storing code that comprises instructions executable by one or more processors to:

receive, by a data clean room orchestration system, an indication of mutually attested code for a data clean room between two or more partners, wherein the mutually attested code is co-authored by the data clean room orchestration system and at least one of the two or more partners, and wherein an image digest of the mutually attested code has been mutually approved by the two or more partners;

configure, by the data clean room orchestration system, a trusted execution environment for the data clean room between the two or more partners, the trusted execution environment comprising one or more secure virtual machines (VMs) that execute on a hypervisor of the host machine and that are isolated from the hypervisor and a host operating system of the host machine by a hardware-based trusted execution environment, wherein the one or more secure VMs are individually or collectively operable to execute the mutually attested code;

obtain, by the one or more secure VMs in the trusted execution environment configured by the data clean room orchestration system, two or more partner datasets encrypted with respective secret keys of the two or more partners;

transmit, to endpoints associated with the two or more partners, an attestation report comprising at least an encrypted token and a host public key of a host machine associated with the one or more secure VMs, wherein the host public key is contained in a self-signed certificate of the host machine that is included in the attestation report, and wherein the attestation report cryptographically binds the host public key to the host machine via a hash value of the self-signed certificate;

receive, by the one or more secure VMs, the respective secret keys wrapped with the host public key of the host machine, wherein one of the respective secret keys is released by a corresponding one of the two or more partners in response to the corresponding partner verifying the encrypted token of the attestation report; and execute the mutually attested code on the two or more partner datasets in the trusted execution environment based at least in part on using a host private key of the host machine to unwrap the respective secret keys.

* * * * *